United States Patent
Sakata et al.

(10) Patent No.: US 10,890,243 B2
(45) Date of Patent: Jan. 12, 2021

(54) MOTOR WITH DECELERATION MECHANISM

(71) Applicant: MITSUBA Corporation, Gunma (JP)

(72) Inventors: Kenji Sakata, Gunma (JP); Hiroyuki Yoshida, Gunma (JP); Satoru Yoshida, Gunma (JP)

(73) Assignee: MITSUBA Corporation, Gunma (JP)

( * ) Notice: Subject to any disclaimer, the term of this patent is extended or adjusted under 35 U.S.C. 154(b) by 13 days.

(21) Appl. No.: 16/388,895

(22) Filed: Apr. 19, 2019

(65) Prior Publication Data
US 2019/0331208 A1  Oct. 31, 2019

(30) Foreign Application Priority Data
Apr. 27, 2018 (JP) ................. 2018-086504

(51) Int. Cl.
| | | |
|---|---|---|
| F16H 1/16 | (2006.01) | |
| F16H 57/021 | (2012.01) | |
| F16C 21/00 | (2006.01) | |
| H02K 7/08 | (2006.01) | |
| H02K 7/116 | (2006.01) | |
| F16H 57/02 | (2012.01) | |

(52) U.S. Cl.
CPC ........... *F16H 57/021* (2013.01); *F16C 21/00* (2013.01); *F16H 1/16* (2013.01); *H02K 7/081* (2013.01); *H02K 7/1166* (2013.01); *F16C 2361/61* (2013.01); *F16H 2057/0213* (2013.01); *F16H 2057/02034* (2013.01); *H02K 2205/03* (2013.01)

(58) Field of Classification Search
CPC ....... F16H 57/021; F16C 21/00; H02K 7/081; H02K 7/1166

USPC ........................................................... 310/90
See application file for complete search history.

(56) References Cited

U.S. PATENT DOCUMENTS

| | | | | |
|---|---|---|---|---|
| 7,677,806 | B2 * | 3/2010 | Moehring | F16C 17/08 384/243 |
| 8,148,862 | B2 * | 4/2012 | Shirai | F16C 17/02 310/67 R |
| 2013/0147295 | A1 * | 6/2013 | Shimizu | H02K 7/081 310/90 |
| 2013/0321951 | A1 * | 12/2013 | Sumiji | F16O 33/745 360/99.08 |

(Continued)

FOREIGN PATENT DOCUMENTS

| | | | |
|---|---|---|---|
| JP | S5649646 | 5/1981 | |
| JP | 20141711377 | * 9/2014 | H02K 7/102 |
| WO | 2010110112 | 9/2010 | |

*Primary Examiner* — Terrance L Kenerly
(74) *Attorney, Agent, or Firm* — JCIPRNET

(57) ABSTRACT

The motor with deceleration mechanism includes: a motor shaft (11), which is accommodated in a motor case (21) and in which an axial end portion (11*a*) is formed into a spherical shape; a worm, arranged on the motor shaft (11); a worm wheel, accommodated in a gear frame and engaging with the worm; a radial bearing (41), rotatably supporting the motor shaft (11); and a first thrust bearing (42), which is disposed inside the motor case (21), and in which a shaft facing surface (42*s*) facing the axial end portion (11*a*) of the motor shaft (11) and a counter shaft facing surface (42*c*) on the opposite side are respectively formed spherically; an average sliding radius between the first thrust bearing (42) and the motor case (21) is larger than an average sliding radius between the first thrust bearing (42) and the motor shaft (11).

10 Claims, 3 Drawing Sheets

(56) References Cited

U.S. PATENT DOCUMENTS

2015/0130329 A1\* 5/2015 Kawashima ........... H02K 23/04
310/68 C

\* cited by examiner

MOTOR WITH DECELERATION MECHANISM

CROSS REFERENCE TO RELATED APPLICATIONS

This application claims the priority benefit of Japanese Patent Application No. 2018-086504, filed on Apr. 27, 2018. The entirety of the above-mentioned patent application is hereby incorporated by reference herein and made a part of this specification.

BACKGROUND

Technical Field

The disclosure relates to a motor with deceleration mechanism.

Related Art

Conventionally, a motor with deceleration mechanism which is rotated and driven by a driving current from an in-vehicle battery is used as a driving source of a power window device or a wiper device or the like loaded on an automobile (for example, see patent literature 1).

In this kind of motor with deceleration mechanism, a bearing structure of a motor shaft in which a disk-shaped thrust bearing is disposed in front of the motor shaft is adopted (for example, see patent literature 2).

LITERATURE OF RELATED ART

Patent Literature

[Patent literature 1] International Publication No. WO 2010/110112

[Patent literature 2] Japanese Laid-open No. S56-049646

However, since a contact between a spherically shaped motor shaft leading end portion and a disk-shaped thrust bearing is a point contact, a shaft holding force for preventing a reverse rotation of the motor shaft during the non-operation state of the motor is small, and the reverse rotation of the motor shaft may occur. In addition, since a contact between the disk-shaped thrust bearing and a motor case is a surface contact, a sliding radius is small (a rotation resistance is small), the thrust bearing may co-rotate with the motor shaft and the starting performance during the operation state of the motor is not good.

Therefore, the disclosure is accomplished based on the above-described problems and provides a motor with deceleration mechanism which improves the shaft holding force during the non-operation state of the motor and improves the starting performance during the operation state of the motor.

SUMMARY

The disclosure is grasped by the following aspects.

One aspect of the disclosure is a motor with deceleration mechanism including: a motor shaft, which is accommodated in a motor case and in which an axial end portion is formed into a spherical shape; a worm gear, arranged on the motor shaft; a worm wheel, accommodated in a gear frame and engaging with the worm gear; a radial bearing, rotatably supporting the motor shaft; and a first thrust bearing, which is disposed inside the motor case and in which a shaft facing surface facing the axial end portion of the motor shaft and a counter shaft facing surface on an opposite side are respectively formed spherically; wherein an average sliding radius between the first thrust bearing and the motor case is larger than an average sliding radius between the first thrust bearing and the motor shaft.

Another aspect of the disclosure is a motor with deceleration mechanism including: a motor shaft, accommodated in a motor case; a worm shaft, which is connected to the motor shaft and in which an axial end portion is formed into a spherical shape; a worm gear, arranged on the worm shaft; a worm wheel, accommodated in a gear frame and engaging with the worm gear; a radial bearing, rotatably supporting the motor shaft and the worm shaft respectively; and a second thrust bearing, which is disposed inside the gear frame, and in which a shaft facing surface facing the axial end portion of the motor shaft and a counter shaft facing surface on the opposed side are respectively formed spherically; wherein an average sliding radius between the second thrust bearing and the gear frame is larger than an average sliding radius between the second thrust bearing and the worm shaft.

DESCRIPTION OF THE EMBODIMENTS

In the following, an embodiment of the disclosure is described in detail based on accompanying drawings. Besides, in the embodiment of the specification, the same members are donated by the same symbols throughout.

Figure 1:
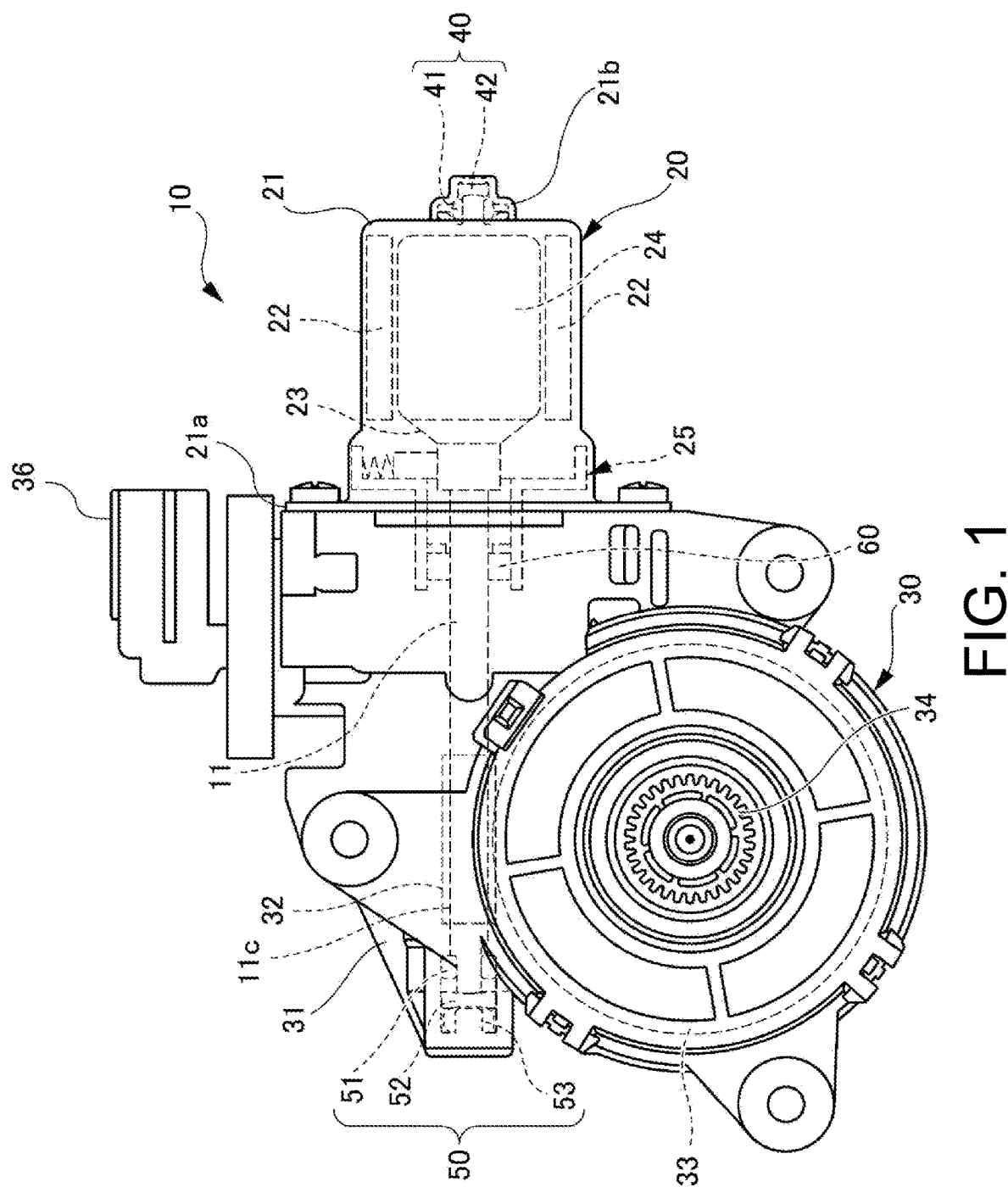
FIG. 1 is a side view showing a motor with deceleration mechanism of an embodiment of the disclosure.

A motor with deceleration mechanism 10 of the embodiment of the disclosure is described. FIG. 1 is a side view showing the motor with deceleration mechanism 10 of the embodiment of the disclosure.

As shown in FIG. 1, the motor with deceleration mechanism 10 includes a motor portion 20 and a deceleration mechanism portion 30. The motor with deceleration mechanism 10 is used as a driving source for driving a window regulator which lifts and lowers a window glass in a power window device loaded on a vehicle such as an automobile. In addition, the motor portion 20 is fixed to the deceleration mechanism portion 30 by screws and the like, and thereby the motor with deceleration mechanism 10 is integrated.

The motor portion 20 includes a motor case 21 of a bottomed tubular shape. In the motor case 21, a flange 21a is formed on an opening side, and a stepped small-diameter portion 21b is formed on a bottom side. For example, the motor case 21 is formed by performing a press-processing or deep-draw processing on a steel plate of magnetic material and acts as a yoke constituting the motor.

In the motor case 21, four magnets 22, a coil 23, an armature (rotor) 24, a brush holder 25, a commutator, a brush and the like, which constitute the motor, are respectively accommodated. Besides, in the motor case 21, a rotation sensor for detecting rotation of the motor and a magnet for sensor and the like are also accommodated.

In the armature 24, a motor shaft 11 is fixed penetrating an axial center. As for the motor shaft 11, an axial end portion 11a on one side is located inside the motor case 21, and an axial end portion 11b on the other side is located inside a gear frame 31 described later. Besides, one motor shaft 11 extends across the deceleration mechanism portion 30 from the motor portion 20.

In the axial end portions 11a, 11b of the motor shaft 11, end surfaces are respectively formed into spherical shapes with spherical radiuses SR1, SR2. Besides, in the embodiment, the spherical radiuses SR1, SR2 are equal to each other, but they may also be different.

The deceleration mechanism portion 30 includes a gear frame 31 made of a resin (for example, polybutylene terephthalate (PBT) or the like) and formed by injection molding process. The flange 21a of the motor case 21 is fixed to the gear frame 31 by screws and the like.

In the gear frame 31, a worm gear accommodation portion extending along an axial direction of the motor shaft 11 and a worm wheel accommodation portion close to the worm gear accommodation portion are formed. A worm gear 32 is accommodated inside the worm gear accommodation portion, and a bearing accommodation portion 35 that accommodates a gear frame side bearing mechanism 50 described later is formed to connect with the worm gear accommodation portion.

The worm gear 32 is in a substantially tubular shape which engages with a worm wheel 33, and is mounted on a worm gear mounting portion 11c on the other side of the motor shaft 11 by press-fitting and the like. Therefore, when the motor shaft 11 rotates, the worm gear 32 also rotates and the rotation is transmitted to the worm wheel 33.

In addition, in the worm wheel accommodation portion, the worm wheel 33 engaging with the worm gear 32 is accommodated.

An output gear 34 is disposed coaxially with the worm wheel 33, and the output gear 34 also rotates along with the rotation of the worm wheel 33. The output gear 34 transmits power to the window regulator that is not illustrated. Accordingly, the rotation of the motor shaft 11 is decelerated by the worm gear 32 and the worm wheel 33 and converted to the rotation of an axial direction orthogonal to the axis of the motor shaft 11, and is transmitted as the rotation of the output gear 34.

Meanwhile, in the motor with deceleration mechanism 10, a terminal portion 36, to which external connectors such as power lines and signal lines connected to an in-vehicle battery or in-vehicle controller or the like are connected, is arranged on the gear frame 31. An unillustrated control board is accommodated in the terminal portion 36. The in-vehicle controller controls a rotation speed (a rotation number) or a rotation direction of the motor shaft 11 via a control circuit of the control board, and performs a rotation control of the motor.

Figure 2:
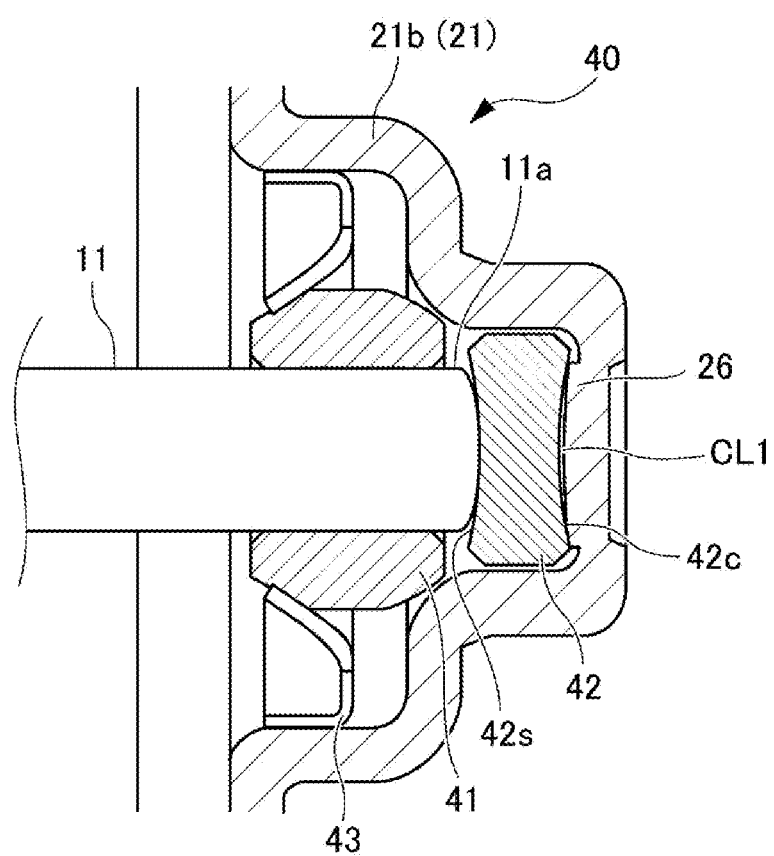
FIG. 2 is an enlarged cross-sectional view showing a motor case side bearing mechanism.
Figure 3:
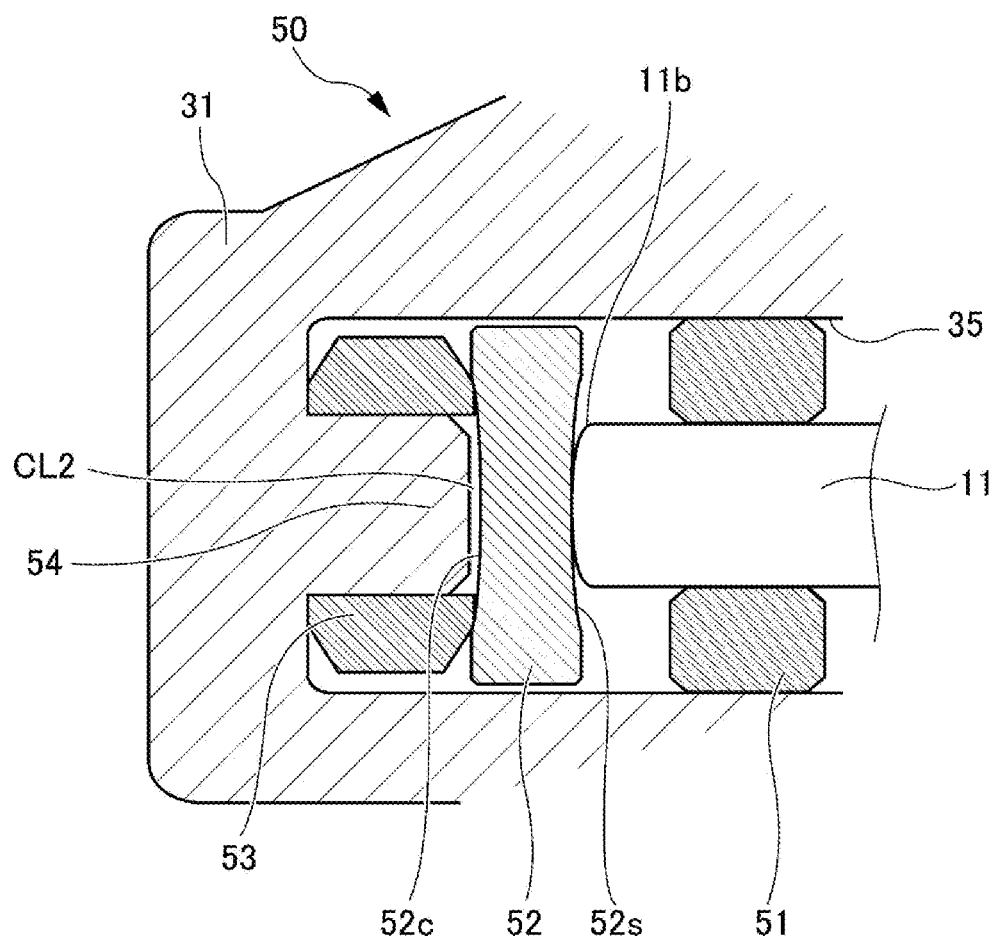
FIG. 3 is an enlarged cross-sectional view showing a gear frame side bearing mechanism.

Next, a bearing structure of the motor shaft 11 is described. FIG. 2 is an enlarged cross-sectional view showing a motor case side bearing mechanism 40. FIG. 3 is an enlarged cross-sectional view showing the gear frame side bearing mechanism 50. Besides, the motor shaft 11 is rotatably supported by the motor case side bearing mechanism 40 and the gear frame side bearing mechanism 50, but a brush holder side bearing mechanism (a third radial bearing 60) may be added as necessary so that the motor shaft 11 is supported in three places.

Firstly, the motor case side bearing mechanism 40 which rotatably supports one end side of the motor shaft 11 is accommodated in the stepped small-diameter portion 21b of the motor case 21 as shown in FIG. 2. The motor case side bearing mechanism 40 includes a first radial bearing 41 and a first thrust bearing 42.

The first radial bearing 41 is referred to as a bearing metal and formed into a substantially cylindrical shape, and rotatably supports one end side of the motor shaft 11 by the inner peripheral surface. The first radial bearing 41 is formed by impregnating a porous metal body manufactured by powder metallurgy with lubricating oil.

In addition, the first radial bearing 41 is sandwiched and fixed by a bearing suppressing member 43 which is attached to the inner side on a large-diameter side of the stepped small-diameter portion 21b and the inner side of a step of the stepped small-diameter portion 21b.

The first thrust bearing 42 is made of resin(for example, nylon) and formed into a substantially disk shape, and includes a shaft facing surface 42s facing the axial end portion 11a of the motor shaft 11 and a counter shaft facing surface 42c facing a first support convex portion 26 arranged in the motor case 21. The first thrust bearing 42 supports the axial end portion 11a on one end side of the motor shaft 11 from the axial direction by way of surface contact.

The shaft facing surface 42s is recessed in a spherical concave shape. A spherical radius CR1 of the shaft facing surface 42s may be equal to or larger than the spherical radius SR1 of the convex shape of the axial end portion 11a of the motor shaft 11; in addition, a maximum diameter of the concavity is equal to or larger than a diameter of the motor shaft 11. When the spherical radius CR1 is equal to the spherical radius SR1, the contact is a surface contact; when the spherical radius CR1 is larger than the spherical radius SR1, theoretically the contact is a point contact, but actually the contact is between the resin-made first thrust bearing 42 and the steel-made motor shaft 11 and thus becomes substantially a surface contact. Besides, in order to increase a friction coefficient (resistance), the shaft facing surface 42s may be subjected to minute irregularities processing, emboss processing, and texturing processing and the like.

Next, similar to the shaft facing surface 42s, the counter shaft facing surface 42c is also recessed in a spherical concave shape. A spherical radius CR2 of the counter shaft facing surface 42c is equal to the spherical radius CR1 of the shaft facing surface 42s; in addition, a maximum diameter of the concavity is equal to or larger than the diameter of the motor shaft 11.

In addition, the radial outer side of the counter shaft facing surface 42c is circumferentially supported by the first support convex portion 26 in line contact. That is, the first thrust bearing 42 is supported in a sandwiched state capable of rotating between the motor shaft 11 and the first support convex portion 26. In addition, a clearance CL1 is formed in a space covered by the counter shaft facing surface 42c and the first support convex portion 26 (that is, a region covered by the counter shaft facing surface 42c and the first support convex portion 26 becomes hollow). Besides, the diameter of the first support convex portion 26 may be equal to or larger than the diameter of the motor shaft.

Accordingly, the motor case side bearing mechanism 40 rotatably supports one end side of the motor shaft 11 from the radial outer side and the axial outer side.

Besides, in the embodiment, the shaft facing surface 42s and the counter shaft facing surface 42c, in which the spherical radiuses CR1, CR2 and the maximum depths are equal, are formed into symmetrical shapes. Furthermore, there is a relationship that a frictional resistance between the counter shaft facing surface 42c and the first support convex portion 26 is larger than the frictional resistance between the shaft facing surface 42s and the axial end portion 11a of the motor shaft 11, so that a reverse holding force is provided to prevent the motor shaft 11 from rotating even if an external force acts when the motor does not operate, and a co-rotation of the first thrust bearing 42 is prevented when the motor operates.

That is, it is preferable that a relationship (X1>Y1) is satisfied, in which an average sliding radius X1 between the first thrust bearing 42 and the motor case 21 is larger than an average sliding radius Y1 between the first thrust bearing 42 and the motor shaft 11. Besides, when the above-described relationship is satisfied, the shaft facing surface 42$s$ and the counter shaft facing surface 42$c$ may be formed by different spherical radiuses CR1, CR2.

Herein, an average sliding radius De is represented by De=$2/3 \times (DO^3 - DI^3)/(DO^2 - DI^2)$ (referred to as "Formula 1" hereinafter) where DO represents an outer diameter of the rotation body and DI represents an inner diameter of the rotation body (DI is set to "0" in a case of being solid). Then, a torque T that can be transmitted to a contacted body by the contact with a solid or hollow rotation body can be expressed by T=$\mu \times F \times De$ where F represents a contact pressure, $\mu$ represents a friction coefficient, and De represents the average sliding radius.

For example, when (1) a hollow cylindrical body in which DO is 15 mm and DI is 10 mm and (2) a solid columnar body in which DO is 15 mm are respectively in surface contact with a flat surface, the average sliding radius De is 12.67 mm in (1) and 10 mm in (2), and the average sliding radius De of the hollow cylinder body of (1) can be greater when (1) and (2) are rotation bodies of the same outer diameter.

On the other hand, the gear frame side bearing mechanism 50 which rotatably supports the other side of the motor shaft 11 is accommodated in the bearing accommodation portion 35 as shown in FIG. 3. The gear frame side bearing mechanism 50 includes a second radial bearing 51, a second thrust bearing 52 and an elastic member 53.

Similar to the first radial bearing 41, the second radial bearing 51 is referred to as a bearing metal and formed into a substantially cylindrical shape, and rotatably supports the other side of the motor shaft 11 by the inner peripheral surface. The second radial bearing 51 is also formed by impregnating a porous metal body manufactured by powder metallurgy with lubricating oil.

Similar to the first thrust bearing 42, the second thrust bearing 52 is made of resin (for example, nylon) and formed into a substantially disk shape, and includes a shaft facing surface 52$s$ facing the axial end portion 11$a$ of the motor shaft 11 and a counter shaft facing surface 52$c$ facing a second support convex portion 54 arranged in the gear frame 31. The second thrust bearing 52 supports the axial end portion 11$b$ on the other side of the motor shaft 11 from the axial direction by way of surface contact.

The shaft facing surface 52$s$ is recessed in a spherical concave shape. A spherical radius CR3 of the shaft facing surface 52$s$ may be larger than the spherical radius SR2 of the convex shape of the axial end portion 11$b$ of the motor shaft 11; in addition, a maximum diameter of the concavity is equal to or larger than the diameter of the motor shaft 11. When the spherical radius CR3 is equal to the spherical radius SR2, the contact is a surface contact; when the spherical radius CR3 is larger than the spherical radius SR2, theoretically the contact is a point contact, but actually the contact is between the resin-made second thrust bearing 52 and the steel-made motor shaft 11 and thus becomes substantially a surface contact. Besides, in order to increase a friction coefficient (resistance), the shaft facing surface 52$s$ may be subjected to minute irregularities processing, emboss processing, and texturing processing and the like.

Next, similar to the shaft facing surface 52$s$, the counter shaft facing surface 52$c$ is also recessed in a spherical concave shape. A spherical radius CR4 of the counter shaft facing surface 52$c$ is equal to the spherical radius CR3 of the shaft facing surface 52$s$; in addition, a maximum diameter of the concavity is equal to or larger than the diameter of the motor shaft 11.

In addition, the radial outer side of the counter shaft facing surface 52$c$ is supported circumferentially by the elastic member 53 described later in line contact. That is, the second thrust bearing 52 is supported in a semi-sandwiched state capable of rotating between the motor shaft 11 and the elastic member 53.

The elastic member 53 is an elastic body formed substantially annularly, and is disposed closer to the axial end portion 11$b$ side than the second thrust bearing 52. Specifically, the elastic member 53 is attached to the columnar second support convex portion 54 arranged in the gear frame 31.

The elastic member 53 in which the width is wider than the length of the second support convex portion 54 separates the second thrust bearing 52 from the end surface of the second support convex portion 54 in a normal (non-compressed) state. Besides, when the counter shaft facing surface 52$c$ and the second support convex portion 54 come into contact, a clearance CL2 is formed in a space covered by the counter shaft facing surface 52$c$ and the second support convex portion 54 (that is, a region covered by the counter shaft facing surface 52$c$ and the second support convex portion 54 becomes hollow). Besides, the diameter of the second support convex portion 54 may be equal to or larger than the diameter of the motor shaft 11.

Accordingly, the gear frame side bearing mechanism 50 rotatably supports the other side of the motor shaft 11 from the radial outer side and the axial outer side.

Besides, in the embodiment, the shaft facing surface 52$s$ and the counter shaft facing surface 52$c$, in which the spherical radiuses CR3, CR4 and the maximum depths are equal, are formed into symmetrical shapes. Furthermore, there is a relationship that a frictional resistance between the counter shaft facing surface 52$c$ and the elastic member 53 is larger than the frictional resistance between the shaft facing surface 52$s$ and the axial end portion 11$b$ of the motor shaft 11, so that a reverse holding force is provided to prevent the motor shaft 11 from rotating even if an external force acts when the motor does not operate, and a co-rotation of the second thrust bearing 52 is prevented when the motor operates.

In other words, it is preferable that a relationship (X2>Y2) is satisfied, in which an average sliding radius X2 between the second thrust bearing 52 and the elastic member 53 is larger than an average sliding radius Y2 between the second thrust bearing 52 and the motor shaft 11.

As described above, the motor with deceleration mechanism 10 of the embodiment of the disclosure includes the motor shaft 11 which is accommodated in the motor case 21 and in which the axial end portion 11$a$ is formed into a spherical shape, the worm gear 32 arranged on the motor shaft 11, the worm wheel 33 accommodated in the gear frame 31 and engaging with the worm gear 32, the first radial bearing 41 and the second radial bearing 51 which rotatably support the motor shaft 11, and the first thrust bearing 42 which is disposed inside the motor case 21 and in which the shaft facing surface 42$s$ facing the axial end portion 11$a$ of the motor shaft 11 and the counter shaft facing surface 42$c$ on the opposite side are respectively formed into a spherical shape, and the average sliding radius X1 between the first thrust bearing 42 and the motor case 21 is larger than the average sliding radius Y1 between the first thrust bearing 42 and the motor shaft 11. As a result, the shaft holding force for preventing the reverse rotation of the motor shaft 11 during the non-operation state of the motor can be improved. In addition, the co-rotation of the first thrust bearing 42 during the operation state of the motor can be prevented with a minimum number of components, and the starting performance is good; furthermore, the lubricating oil can be held in the sliding portion.

In the motor with deceleration mechanism 10 of the embodiment, the motor case 21 includes the first support convex portion 26 which supports the first thrust bearing 42, the first support convex portion 26 peripherally supports the radial outer side of the counter shaft facing surface 42c of the first thrust bearing 42, and the clearance CL1 is formed in the space covered by the first support convex portion 26 and the counter shaft facing surface 42c of the first thrust bearing 42. As a result, based on the above-described Formula 1, it is easy to increase the average sliding radius X1 between the first thrust bearing 42 and the motor case 21.

In the motor with deceleration mechanism 10 of the embodiment, the second thrust bearing 52 is further included, which is disposed inside the gear frame 31, and in which the shaft facing surface 52s facing the axial end portion 11b of the motor shaft 11 and the counter shaft facing surface 52c on the opposite side are respectively formed spherically. The average sliding radius X2 between the second thrust bearing 52 and the gear frame 31 is larger than the average sliding radius Y2 between the second thrust bearing 52 and the motor shaft 11. As a result, the shaft holding force for preventing the reverse rotation of the motor shaft 11 during the non-operation state of the motor can be further improved.

In the motor with deceleration mechanism 10 of the embodiment, the second support convex portion 54 which supports the elastic member 53 is arranged on the gear frame 31, the elastic member 53 peripherally supports the radial outer side of the counter shaft facing surface 52c of the second thrust bearing 52, and the clearance CL2 is formed between the second support convex portion 54 and the counter shaft facing surface 52c of the second thrust bearing 52. As a result, based on the above-described Formula 1, the average sliding radius X2 between the second thrust bearing 52 and the gear frame 31 is easily increased.

In the motor with deceleration mechanism 10 of the embodiment, the shaft facing surfaces 42s, 52s and the counter shaft facing surfaces 42c, 52c are in symmetrical shapes. As a result, a directional property at the time of assembling the first thrust bearing 42 and the second thrust bearing 52 disappears, and occurrence of an erroneous assembly caused by an operator or a robot can be prevented.

The embodiment of the disclosure is specifically described above, but the disclosure is not limited to the above-described embodiment, and various modifications and changes can be made within the scope of the gist of the disclosure recited in the scope of claims.

In the first thrust bearing 42 and the second thrust bearing 52 of the above embodiment, the shaft facing surfaces 42s, 52s and the counter shaft facing surfaces 42c, 52c are formed in a manner that the spherical radiuses CR1, CR2, CR3, CR4 and the maximum depths are equal, but when the above-described relationships (X1>Y1, X2>Y2) of the average sliding radiuses X1 and Y1, X2 and Y2 are satisfied, the shaft facing surface 42s, 52s and the counter shaft facing surfaces 42c, 52c may be formed in different spherical radiuses CR1, CR2, CR3, and CR4.

In the above embodiment, the armature 24 and the worm gear 32 are mounted on one motor shaft 11 accommodated across the motor case 21 and the gear frame 31, and are supported by the motor case side bearing mechanism 40 and the gear frame side bearing mechanism 50, but the worm gear 32 may also be mounted on a different worm shaft coaxial with the motor shaft 11.

At this time, the axial end portion on one side of the worm shaft is connected to the axial end portion 11b on the other side of the motor shaft 11 by a connection member such as a coupling, and the axial end portion on the other side is formed into a spherical shape. Besides, the axial end portion on the other side of the worm shaft faces or is in contact with the shaft facing surface 52s of the second thrust bearing 52. In addition, the average sliding radius X2 between the second thrust bearing 52 and the gear frame 31 is larger than an average sliding radius Y3 between the second thrust bearing 52 and the worm shaft (X2>Y3).

In this case, the shaft holding force for preventing the reverse rotation of the motor shaft 11 or the worm shaft during the non-operation state of the motor can also be improved. In addition, the co-rotation of the first thrust bearing 42 and the second thrust bearing 52 during the operation state of the motor can be prevented with the minimum number of components, and the starting performance is good. Furthermore, since a structure for holding the lubricating oil can also be formed, even in a case that the motor is left unattended after being exposed to a high temperature, the lubricating oil is present in the sliding portion and the starting performance does not deteriorate.

In the aspect of (1), a first support convex portion which supports the first thrust bearing may be arranged on the motor case, the first support convex portion peripherally supports a radial outer side of the counter shaft-facing surface of the first thrust bearing, and a clearance is formed in a space covered by the first support convex portion and the counter shaft-facing surface of the first thrust bearing.

In the aspect of (1) or (2), a second thrust bearing may be further included, which is disposed inside the gear frame, and in which a shaft facing surface facing the axial end portion of the motor shaft and a counter shaft facing surface on the opposite side are respectively formed spherically; and an average sliding radius between the second thrust bearing and the gear frame is larger than an average sliding radius between the second thrust bearing and the motor shaft.

In the aspect of (3) or (4), a second support convex portion which supports an elastic member may be arranged on the gear frame, the elastic member peripherally supports a radial outer side of the counter shaft facing surface of the second thrust bearing, and a clearance is formed in a space between the second support convex portion and the counter shaft facing surface of the second thrust bearing.

In the aspect of any one of (1) to (5), the shaft facing surface and the counter shaft facing surface may be in symmetrical shapes.

According to the disclosure, the motor with deceleration mechanism which improves the shaft holding force during the non-operation state of the motor and improves the starting performance during the operation state of the motor can be provided.

What is claimed is:
1. A motor with deceleration mechanism, comprising: a motor shaft, which is accommodated in a motor case and in which an end surface of an axial end portion is formed in a spherical convex shape;
a worm gear, arranged on the motor shaft;

a worm wheel, accommodated in a gear frame and engaging with the worm gear;

a radial bearing, rotatably supporting the motor shaft; and a first thrust bearing, which is disposed inside the motor case, and in which a first shaft facing surface facing the end surface of the axial end portion of the motor shaft is recessed in a spherical concave shape and a first counter shaft facing surface on an opposite side is recessed in a spherical concave shape;

wherein an average sliding radius between the first thrust bearing and the motor case is larger than an average sliding radius between the first thrust bearing and the motor shaft.

2. The motor with deceleration mechanism according to claim 1, wherein a first support convex portion which supports the first thrust bearing is arranged on the motor case;

the first support convex portion peripherally supports a radial outer side of the counter shaft facing surface of the first thrust bearing; and a clearance is formed in a space covered by the first support convex portion and the first counter shaft facing surface of the first thrust bearing.

3. The motor with deceleration mechanism according to claim 2, further comprising:

a second thrust bearing, which is disposed inside the gear frame, and in which a second shaft facing surface facing the axial end portion of the motor shaft and a second counter shaft facing surface on an opposite side are respectively formed spherically;

wherein an average sliding radius between the second thrust bearing and the gear frame is larger than an average sliding radius between the second thrust bearing and the motor shaft.

4. The motor with deceleration mechanism according to claim 1, further comprising:

a second thrust bearing, which is disposed inside the gear frame, and in which a second shaft facing surface facing the axial end portion of the motor shaft and a second counter shaft facing surface on an opposite side are respectively formed spherically;

wherein an average sliding radius between the second thrust bearing and the gear frame is larger than an average sliding radius between the second thrust bearing and the motor shaft.

5. The motor with deceleration mechanism according to claim 3, wherein a second support convex portion which supports an elastic member is arranged on the gear frame;

the elastic member peripherally supports a radial outer side of the second counter shaft facing surface of the second thrust bearing; and a clearance is formed in a space between the second support convex portion and the second counter shaft facing surface of the second thrust bearing.

6. The motor with deceleration mechanism according to claim 4, wherein a second support convex portion which supports an elastic member is arranged on the gear frame;

the elastic member peripherally supports a radial outer side of the second counter shaft facing surface of the second thrust bearing; and a clearance is formed in a space between the second support convex portion and the second counter shaft facing surface of the second thrust bearing.

7. The motor with deceleration mechanism according to claim 3, wherein the first shaft facing surface and the first counter shaft facing surface are in symmetrical shapes, and the second shaft facing surface and the second counter shaft facing surface are in symmetrical shapes.

8. A motor with deceleration mechanism, comprising:

a motor shaft, accommodated in a motor case;

a worm shaft, which is connected to the motor shaft and in which an end surface of an axial end portion is formed into a spherical convex shape;

a worm gear, arranged on the worm shaft;

a worm wheel, accommodated in a gear frame and engaging with the worm gear;

a radial bearing, rotatably supporting the motor shaft and the worm shaft respectively; and a second thrust bearing, which is disposed inside the gear frame, and in which a shaft facing surface facing the end surface of the axial end portion of the motor shaft is recessed in a spherical concave shape and a counter shaft facing surface on an opposite side is recessed in a spherical concave shape;

wherein an average sliding radius between the second thrust bearing and the gear frame is larger than an average sliding radius between the second thrust bearing and the worm shaft.

9. The motor with deceleration mechanism according to claim 8, wherein a second support convex portion which supports an elastic member is arranged on the gear frame;

the elastic member peripherally supports a radial outer side of the counter shaft facing surface of the second thrust bearing; and a clearance is formed in a space between the second support convex portion and the counter shaft facing surface of the second thrust bearing.

10. The motor with deceleration mechanism according to claim 8, wherein the shaft facing surface and the counter shaft facing surface are in symmetrical shapes.

* * * * *